United States Patent [19]
Froessl

[11] Patent Number: 5,133,024
[45] Date of Patent: Jul. 21, 1992

[54] IMAGE DATA BANK SYSTEM WITH SELECTIVE CONVERSION

[76] Inventor: Horst Froessl, Gutenbergstrasse 2-4, D-6944 Hemsbach, Fed. Rep. of Germany

[21] Appl. No.: 565,983

[22] Filed: Aug. 13, 1990

Related U.S. Application Data

[63] Continuation-in-part of Ser. No. 426,035, Oct. 24, 1989, abandoned.

[51] Int. Cl.⁵ .............................................. G06K 9/00
[52] U.S. Cl. ...................................... 382/41; 382/48; 382/57
[58] Field of Search ........................ 382/47, 48, 57, 41; 340/707, 709, 710, 715

[56] References Cited

U.S. PATENT DOCUMENTS

| | | | |
|---|---|---|---|
| 4,122,443 | 10/1978 | Thaler et al. | 382/48 |
| 4,273,440 | 6/1981 | Froessl | 355/40 |
| 4,553,261 | 5/1985 | Froessl | 382/57 |
| 4,726,065 | 2/1988 | Froessl | 381/41 |
| 4,750,212 | 6/1988 | Yokomizo | 382/48 |

OTHER PUBLICATIONS

Brochure entitled "Modular 4", published by Sorcus Computer GmbH, Heidelberg, Germany (publication date unknown).

"Intelligente und Modulare PC-Karte", Dr. Alfred Hüthig Verlag GmbH, Heidelberg, Germany, Nov. 1988, pp. 78-79; and translation.

Primary Examiner—Leo H. Boudreau
Attorney, Agent, or Firm—Walter C. Farley

[57] ABSTRACT

A system for using market-available scanner and character recognition hardware and software in preparing information from documents for mass storage. Results of character recognition are selectively defined in image and extracted from storage. A camera can also be used for digitizing large and small documents as well as microfilm and microfiche. A multitasking controller with its own microprocessor and RAM provides real time processing. The contents of documents can be stored in image, totally or selectively, conversion from digitized image can be made totally and selectively and passwords from documents can be identified and stored in code. Keyed information can be added as each document's contents are prepared.

16 Claims, 4 Drawing Sheets

IMAGE DATA BANK SYSTEM WITH SELECTIVE CONVERSION

CROSS REFERENCE TO RELATED APPLICATION

This is a continuation-in-part of Ser. No. 426,035 filed Oct. 24, 1989, now abandoned.

This invention relates to an improved system for gathering and storing data from input documents, either totally or selectively, in the form of stored images and also storing in code (machine language) form employing any of a variety of hardware and software products as parts of the system.

BACKGROUND OF THE INVENTION

Earlier patents which discuss the general problems of gathering and selectively storing and converting data include the following:

| 4,273,440 | Froessl | June 16, 1981 |
| 4,553,261 | Froessl | May 31, 1983 |
| 4,726,065 | Froessl | February 16, 1988. |

There are several related problems in the gathering and storage of data to form a data bank from which data can be efficiently retrieved, the significance and nature of these problems varying to some extent with the nature of the input documents and the purpose or purposes for forming the data bank. It will be assumed herein that all of the data to be put into the data bank originates with existing documents, i.e., little or no data is to be created by keying in at the system of the invention. While keying in and creation of data using the system is certainly possible, that is not the purpose for which it has been created.

Since all of the data to be entered is already in a typed or printed "hard copy" form, although possibly with illustrations or hand-written notes, a major objective of any such system is to avoid retyping or rekeying this data, to the extent possible, into the data bank. Thus, optical scanning equipment is to be used, allowing the documents to be fed into the scanning equipment wherein it is converted into electrical digital signals which can be stored as image signals and from which an image can be created on a conventional video, LCD or other display, essentially reproducing a "picture" of the original document. The stored digitized image signals, wherever applicable, can also be converted by character recognition software into a machine language form such as ASCII or other code. In accordance with the earlier patents, this can be done selectively so that desired portions of the documents are in machine-readable form for export to word processing programs or the like and to be available for machine searching.

One problem with prior systems is that they had to be constructed for use with specific scanner hardware and character recognition software so that the controlling software could implement the selection and delivery of portions of the image for conversion. Thus, even if a potential buyer of such a system had a scanner and conversion software, it would be necessary for him or her to purchase the scanning and recognition equipment for which the system was designed.

Another problem with prior systems is that the scanning, conversion and editing were necessarily done in a "serial" or sequential fashion. Such systems used a personal computer (PC) as the heart of the system, the PC microprocessor being the primary data processing tool. Thus the microprocessor was occupied by, first, control of the scanner, then by conversion, if any was being accomplished, and then by editing of the text to make manual corrections or additions. A person doing the editing was thus faced with the need to await completion of the other tasks. It should be mentioned also that the expression "PC" is used herein in the broader sense of meaning any personal computer, not only those which are compatible with machines produced by International Business Machines, Inc.

SUMMARY OF THE INVENTION

An object of the present invention is to provide a system for inputting data to a data bank which facilitates the input and editing steps.

Another object is to provide a system which is capable of using any of a wide variety of types of scanning hardware and character recognition software and make use of the character recognition output in a selective manner together with selective extraction of the image or portions thereof in a combined approach.

A further object is to provide a system which is fast and flexible, allowing high speed as a function of system architecture as well as high operating speeds and allowing operator selection of various functions in the mass input of documents.

Briefly described, the invention comprises a system for facilitating and controlling the input of data from source documents into a data bank including a computer with a microprocessor, addressable memory, a monitor and a program input means such as a disk drive, scanner means for viewing a sequence of documents and producing an output of electrical signals representative of light and dark patterns thereon from which an image of the patterns can be reproduced on the monitor, a controller module for controlling the flow of signals to and from selected portions of the system including the scanner and the computer and for controlling the sequence of operations of the system, the controller module having a microprocessor and addressable memory, connector means for connecting the controller module to the scanner means and to the computer, memory means for temporarily storing the electrical signals representative of said image, character recognition software for converting signals representative of the image into code recognizable by the computer, means for selecting and identifying portions of the image for retrieval of portions of the material converted into code, means, including the controller module, for delivering signals representative of the selected portions to the character recognition software for conversion to code, and mass storage means for storing the code.

BRIEF DESCRIPTION OF THE DRAWINGS

In order to impart full understanding of the manner in which these and other objects are attained in accordance with the invention, particularly advantageous embodiments thereof will be described with reference to the accompanying drawings, which form a part of this specification, and wherein.

DETAILED DESCRIPTION OF THE PREFERRED EMBODIMENTS

Figure 1:
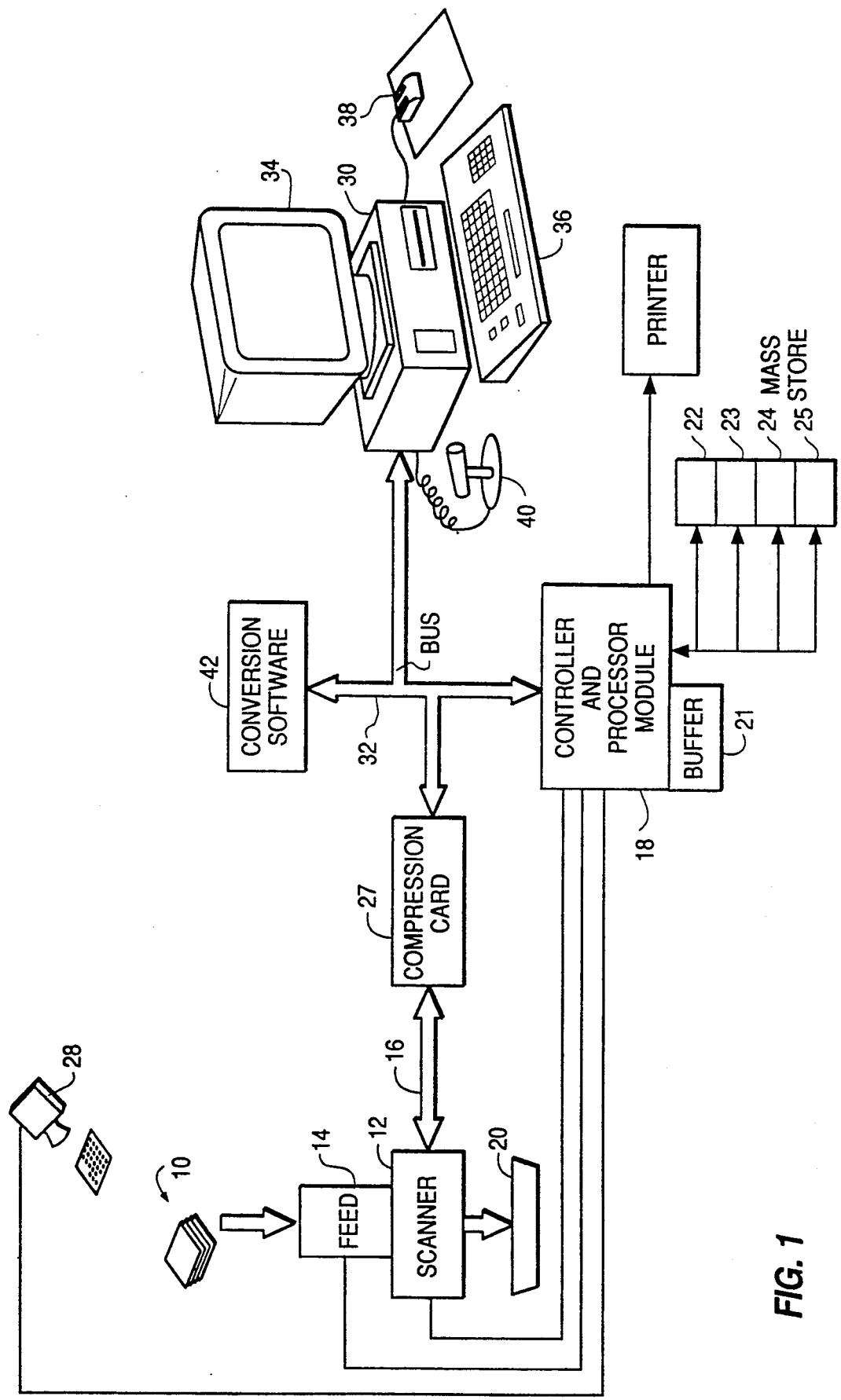
FIG. 1 is a schematic block diagram of a data bank data inputting system in accordance with the invention.

Referring first to FIG. 1, a sequence of source documents indicated generally at 10 is delivered to an optical scanner 12 either manually or by a feeder mechanism 14 of a type similar to those used with photocopying machines. It may be necessary in some cases to prepare documents which are of odd sizes or are too large or too small by photocopying them onto standard size paper before delivery to the feeder 14. Feeder 14 delivers the documents one by one to the input of scanner 12 which scans the documents and produces electrical signals on multiple lines 16 to a compression card 27 for the purpose of compressing image data ultimately to be stored in mass stores 22-25. The same hardware card is normally used to expand the data upon retrieval, using the same basic algorithm as was used for compression. No significant difference in storage speed is encountered when compressing, as compared with storing without compressing, but the advantages in conserved memory are significant. A suitable product for this purpose is the PROSCAN High Speed Document Processor (V. 1.4) from Systemaat B.V., A. Paulownastraat 7, 3331 AA Zwyndrecht, Holland. The scanned documents are deposited in a receptacle 20 for either subsequent archival storage or disposal as circumstances dictate.

The overall process of character recognition, of which scanner 12 is the first stage, generally involves three steps. The first step is scanning or electrooptical conversion to produce the image signals representative of the light and dark regions on the source document. At least three different scan patterns are in common use. Those image signals are then subjected to a preprocessing step in which the output signals from the scanner are converted into a form which can be used by recognition logic or recognition software for character recognition. This involves quantization, in which the analog signals produced by the scanner are refined into digital signals, and may also involve feature recognition. The preprocessing may also include noise elimination. Preprocessing may be done within certain scanner hardware, i.e., the scanner can be provided with preprocessing circuits, but it is more often done by separate hardware.

Finally, the recognition is accomplished either by dedicated logic, by software or by a combination of special logic and software, although software appears to be more common and more efficient in currently manufactured systems. In this context, "recognition" means the conversion of the signals representative of characters forming the image into code representations of those characters. Normally, this would be ASCII code so that it can be imported into other programs, transmitted or otherwise processed in conventional fashions. However, there is no fundamental reason why some code other than ASCII could not be used. For simplicity, the code will be referred to as ASCII herein and the term "conversion" will be used as a synonym for recognition.

As indicated above, an objective of the invention is the provision of a system which can be used with a variety of commercially available scanners and with software which is compatible with those scanners. Furthermore, the result of the character conversion is to be accessed in storage for selective manipulation which is described in more detail hereinafter. For this reason, and other reasons which will be discussed hereinafter, a controller card 18 is provided. Controller card 18 is a modular card which can be either inserted into an expansion slot of a PC or used as a separate, stand-alone module. A specific card which can be adapted for this purpose is the Modular-4 made and sold by Sorcus Computer GmbH, D-6900 Heidelberg, Tullastrasse 19, Federal Republic of Germany. The controller card is illustrated as a separate module in FIG. 1 but this is for functional clarity more than structural significance. Among other things, controller 18 includes a multitasking controller, at least one central processing unit (CPU) which is at least as powerful as that which is likely to be found within the PC and memory in the form of volatile, addressable RAM for use during processing and for other operational purposes. The CPU on card 18 is supplied with the compressed electrical signals from scanner 12 for preprocessing.

Compression card 27 communicates with controller 18 and a computer 30 which is illustrated in FIG. 1 as being a personal computer (PC) on a bus 32. The PC has at least one disk drive for diskettes and, preferably, a hard ("Winchester") drive. PC 30 is provided with a monitor 34, preferably one which is capable of displaying a full page of one of documents 10 at a time without scrolling. PC 30 is connected to a conventional keyboard 36 and preferably also has other input and control devices such as a mouse 38, a microphone 40 for voice input, and suitable software for operating the PC using the mouse in combination with voice or the keyboard in conjunction with voice control. A light pen or touch responsive screen on the monitor can also be used to advantage for identifying portions of a document for conversion or storage, and a horizontal (flat) screen panel can be used to advantage with the combination of speech - touch control, generally as described in the above-identified patents.

Controller 18 is also connected to at least one mass store device, a plurality of mass store units 22, 23, 24 and 25 being illustrated in FIG. 1. These mass store devices can be one or more of a magnetic disk, Digital Audio Tape (DAT) or optical disk devices such as WORM (Write Once Read Many), the selection being made on the basis of the anticipated volume of storage, the frequency and nature of access to the stored information and other factors such as cost. Preferably, WORM is used for permanent image storage especially of material which is non-textual in nature and therefore is not convertible into ASCII code. It is also possible to use an erasable optical disk such as the INSPIRE disk made by Alphatronics, USA.

A digitizing camera 28 can be provided as a separate, alternative input device and connected to controller 18. It is also possible to use camera 28 concurrently with scanner 12, providing digitized images from the camera along with digitized information from the scanner. However, the camera is particularly useful for digitizing images of documents already stored on a microform medium such as microfilm or microfiche, and is also helpful with those which are too large to be fed into the scanner or have other characteristics which make it difficult to use with a particular scanner, especially one which requires the paper to pass through the scanner machine, such as stiffness of the document or a "layout" document on which various parts are taped or glued.

PC 30 and controller 18 are both shown as being provided with conversion software 42 for converting image signals into ASCII code under the control of controller card 18. While it is possible to use the CPU of the PC for this conversion, the PC microprocessor is advantageously used for display and visual/manual selection, including display of the digitized image as well as display of the results of the conversion into code. Controller 18 is thus preferably used for the conversion itself which is conveniently handled as one of the multitasking functions of controller 18. It is, of course, necessary to provide the controller with sufficient RAM to handle the conversion software.

Figure 2:
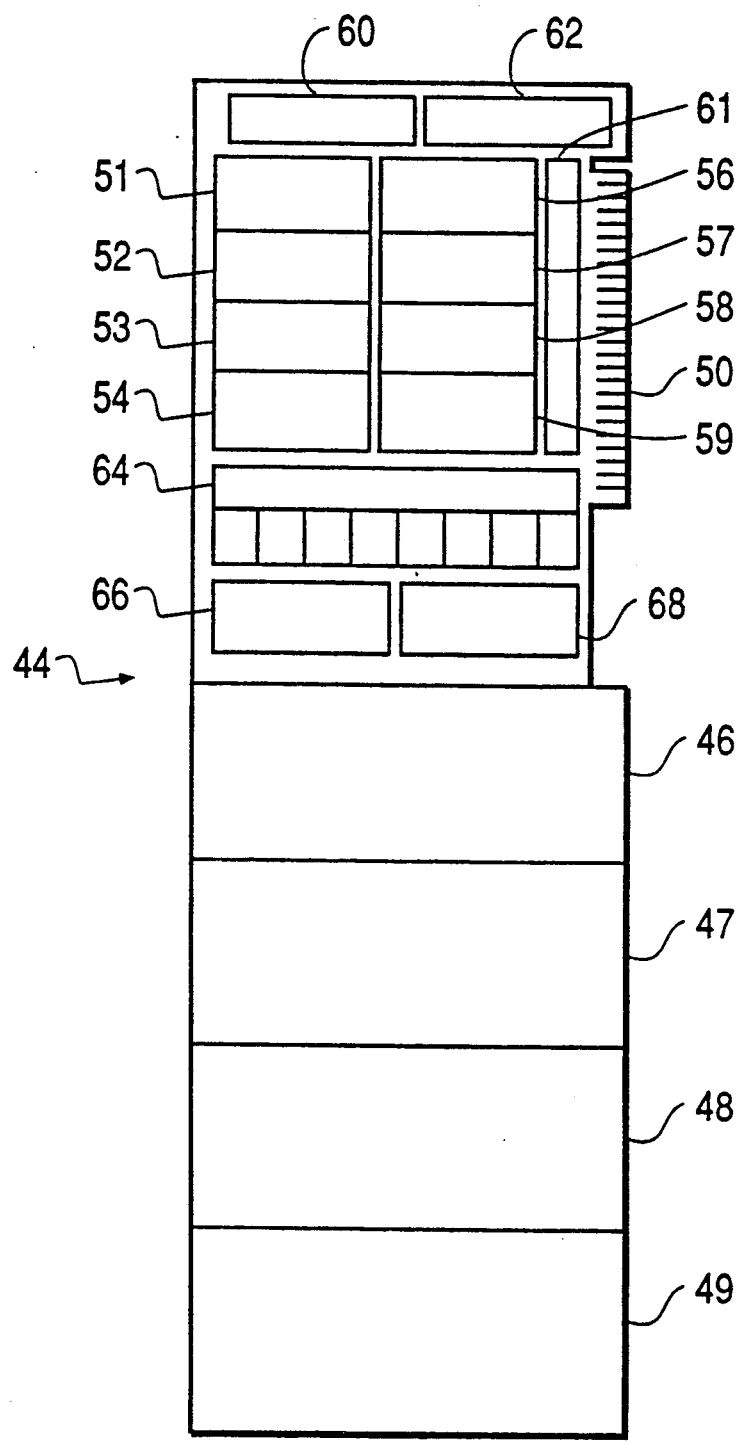
FIG. 2 is a schematic plan view of a controller and processor board usable in the system of FIG. 1.

Before discussing the operation of the system of FIG. 1, reference is made to FIG. 2 which illustrates the layout of the Modular-4 board mentioned above and which is usable as controller card 18. The Modular-4 was originally designed and marketed for the purpose of preparing inputs from measuring devices such as transducers for delivery to a PC in scientific, laboratory or process control environments. For example, several transducers or sensors measuring such parameters as temperature, pressure, rotational speed and the like and producing electrical analog or digital signals, can be connected to the Modular-4 which can organize the signals, put them in a common format and deliver them in any desired order to the PC for insertion into, for example, a spreadsheet or data base, or both, for storage and analysis.

Although it was developed for technical rather than document-handling purposes, its capabilities adapt well to this use. Structurally, the Modular-4 board 44 receives as many as four plug-in modules 46, 47, 48 and 49 each or all of which can be selected from the following: a programmable preamplifier module for receiving 16 analog inputs, 12 bit, 100 kHz (12 bit referring to the resolution of the analog input which is $2^{12}$ or 4096 steps); a module for supplying four analog outputs, 12 bit, current or voltage; a digital interface module for handling a total of 40 digital inputs or outputs and four external trigger or counter inputs; and a bus interface which can be, for example an IEC bus interface, which is a conventional bus system for use with programmable measuring equipment, or a serial interface for data. An edge connector 50 mates with a standard female connector to provide the connection with other equipment. The board carries a CPU 51, a multitasking operating system 52 in EPROM capable of handling 256 tasks, a 64 KB RAM chip 53, extendible to 1 MB, and an interrupt controller 54. Four timers 56, 57, 58 and 59 are provided, two of them being usable as clocks. A parallel printer interface 60 and a serial RS-232 interface 62 are located at the end of the board. A PC interface 61 is mounted adjacent the edge connector 50. An interface 64 for accepting up to eight external trigger inputs is adjacent an SP bus interface 66 and a battery-maintained clock 68. The SP bus interface is an internal bus system on the Modular-4 board for communication between the modules and the on-board processor 51.

For the present system, one Modular-4 board can be mounted in the PC cabinet (which at this stage is merely supplying power to the Modular-4 board for all controller operations) if an expansion slot is available and it would normally be the case that the board would carry the modules comprising at least a serial interface for data and a digital interface for controlling. It must be realized, however, that two or more Modular-4 boards can easily be used together. Thus, if added processing capability is needed for use with a large number of peripherals or a particularly demanding form of conversion software, the number of processing boards can simply be increased since they are designed to be usable in multiples.

The combination of controller 18 and compression card 27 in the system of the present invention allows real-time processing of data for entering into an image data bank.

In accordance with the present invention, the (or each) controller board 18 is provided with control programs stored in EPROM including a selection of drivers to adapt the system to one of a plurality of scanner and software possibilities. As part of an "install" routine, the user is asked to select from a list of possibilities the specific scanner and conversion software with which his or her system is equipped. This allows the system to choose the proper drivers which will be used until equipment is changed and the install program is run again. Using a controller card 18 to control operation of the scanner and also the conversion software allows the use of "user supplied" conversion software, as well as any of several possible scanners, without the necessity of modifying or customizing the conversion program specifically for use with this system. Character recognition programs generally do not provide for manually controlled selective data conversion, thus requiring the user to take a number of steps to obtain desired results. He or she must, for example, switch from image display to character recognition display for selection out of the already converted characters, and then return to image display. This switching loses considerable time and lengthens the processing time. For this reason, the present system contemplates storing image and converted text in code in a single memory file or in correlated addresses in two memory portions or files, either approach allowing access and manipulation without switching files.

Figure 3A:
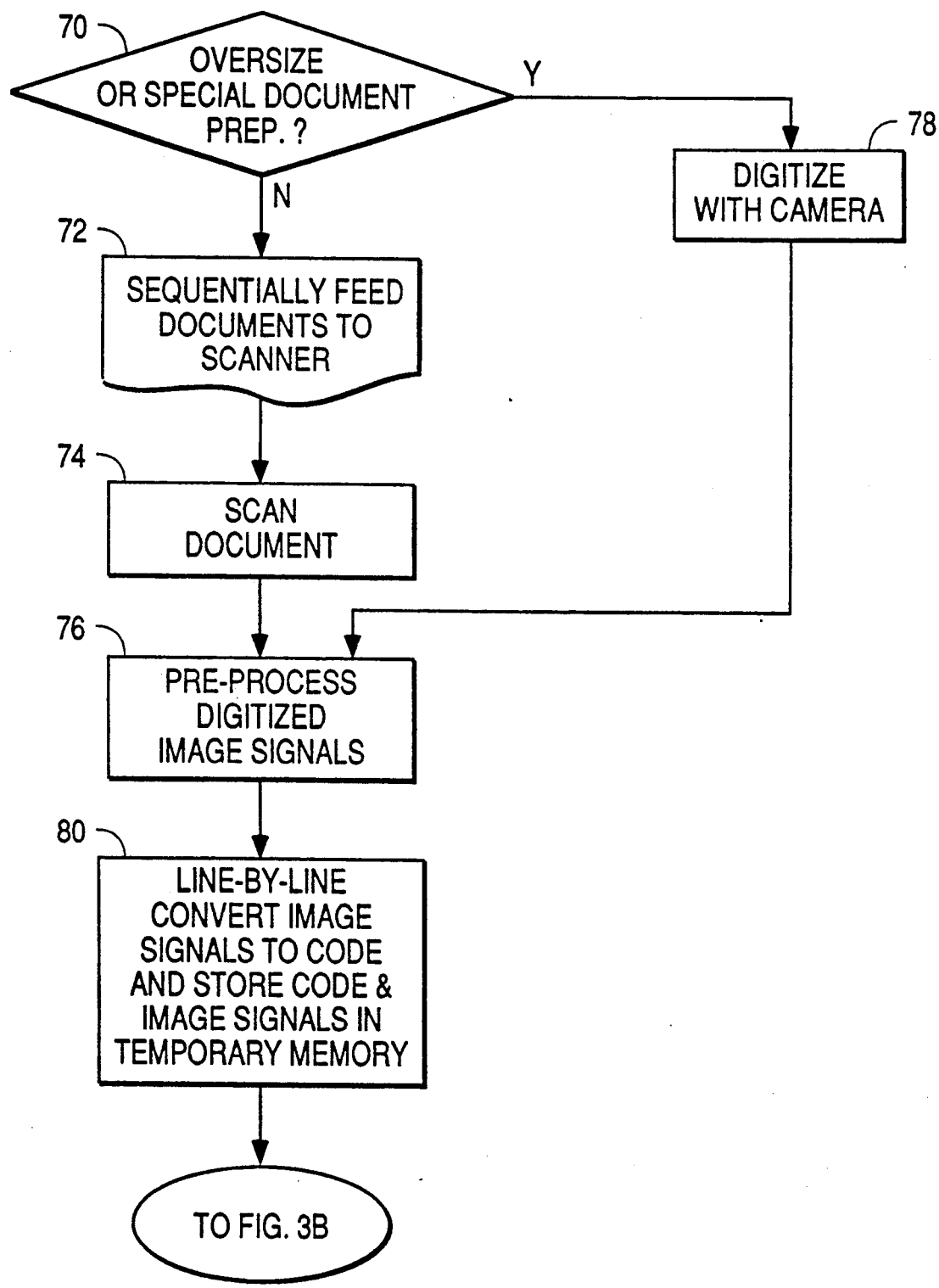
FIGS. 3A and 3B are parts of a flow diagram illustrating a method in accordance with the invention.
Figure 3B:
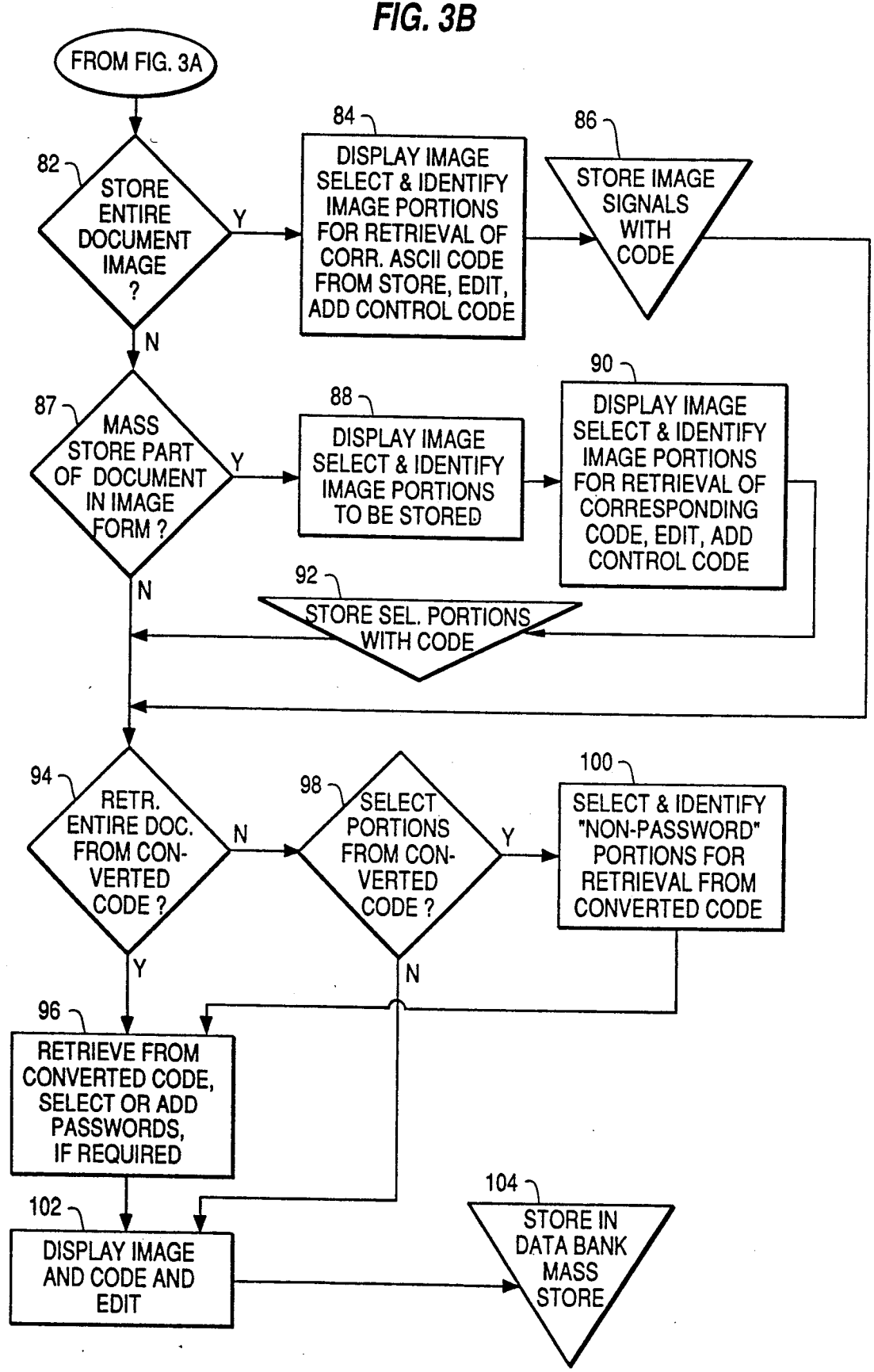

In the process and system of the present invention, the capability is provided for storing in the data bank or mass storage a complete image of one (or each) document or the storage of selected image portions, i.e., storing as an image only portions which have been selected by the user from the full-document image displayed on the screen, and extraction out of ASCII code-converted data of those parts which need to be stored in code form, depending on the needs of the user. Processes which can be followed with the system are illustrated in a "flow diagram" form in FIGS. 3A and 3B. A typical process to be followed in using the system of the invention when complete images of all documents are to be stored begins with preparation 70 of the source documents, if necessary, and delivery 72 of the documents in sequence to the scanner 12 either by hand or with the feeder 14. The source documents are scanned 74, the signals are delivered to controller 18 for preprocessing 76 and the scanned documents are deposited in bin 20. All activities of the scanner and feed are under the control of controller 18. Oversize or special documents are digitized 78 with a camera.

As the image signals are received and preprocessed, line-by-line, the preprocessed digital image signals are delivered 80 to a buffer store 21, which can be part of controller 18 or a part of the PC, for temporary storage and are concurrently displayed on monitor 34. In this temporary store or buffer, it is necessary to assure that there is a location correlation between the stored code and its source image. A particularly advantageous way to do this is to assign correlated memory spaces, in two distinct memory sections, to the ASCII code-converted words and the image signals. If there is a 1:1 correlation, location of the code words instantly tells the system where the source image is located. Thus, the image is stored in a way which can be visualized as a line-by-line representation of the image itself and, in another buffer or separate part of the same buffer, the ASCII code produced from the image is also stored in the same line-by-line arrangement so that there is a physical correlation between the bit-mapped data and the code data. As the image is displayed, the user can designate parts to be separately manipulated by marking beginning and end portions with special symbols, using a touchspeech technique or otherwise selecting a word or phrase. Identifying parts of the image which are to be manipulated also automatically identifies the corresponding group of the ASCII characters because of the correlated storage, i.e., the address of at least the start of each part of the image is the same as the address of at least the start of the converted code for that part but in the other memory section.

Since different amounts of storage are required to store bit-mapping data of text and code of the same text material, the buffer section containing code will be less densely packed than that containing the image, but this is of no consequence.

The storage routine can be written to correlate code and image based on an average or median font size and spacing (i.e., in terms of characters per inch). Then, if the text being handled is larger or smaller, an adjustment is made in a learning mode by displaying a sample of the image produced from the stored, digitized image signals and the same sample produced on the monitor screen from ASCII code, one under the other. If they differ in length, the ASCII spacing is altered to make the lengths the same. This establishes a correction which is thereafter applied to the entire document or set of documents. This "learning" can be done manually or automatically, the routine being very similar in principle to proportional spacing in a word processing program. Any such "learned" conversion program can be stored for subsequent retrieval and use in connection with different fonts.

The memory location correlation is important for real-time processing. Regardless of the speed of conversion, as soon as image lines begin to appear on the monitor from a scanned document, the user can begin to select parts in accordance with the process of the present invention. The user does not have to wait for complete conversion. Even ahead of conversion itself he may define the converted portion he wishes to select. This includes image portions as well. Real-time processing is facilitated if image material (nonconvertible material such as very large headlines and illustrations) is stored in both parts of the buffer memory, i.e., the ASCII part as well as the "image" part, so that when the material is being accessed it is not necessary to go alternately to both parts, i.e., both files.

However, for purposes of memory economy, when information is being "permanently" stored in the data bank mass storage, it is better to store the nonconvertible material such as illustrations in an image section and ASCII or other code in its own portion. With the converted code of accompanying text, an indication of the existence of an illustration or the like and an identification of the illustration (e.g., its address) is stored so that the parts can be recombined efficiently. A password technique can be used.

At this point, a decision 82 is made about the extent of the text to be stored in image form. It is possible to identify one or more segments of the image to be stored in image form or to simply store the entire image of the page. In many cases, it would be desirable to store only portions of the document in image form, recognizing that storage of a bit map of an A4 page will typically use up to 50,000 bytes, even after the image has been compressed, but that storing the same document in a text representation might require only about 2000 bytes.

However, on the assumption that full images of all documents are to be stored, it is necessary to decide (84) which portions of the text will be converted to code and stored (in the data bank mass store) in that form. There are several possible reasons for converting and storing text separately from the image, including the need to be able to edit the text. A major reason, however, is for later identification and retrieval of the stored images. Stored images are difficult to search by computer but code is very fast and easy to search. Thus, if particularly meaningful words from the image are chosen for conversion and storage as code, and if there is a way to correlate the stored code with the stored image from which the converted text was chosen, then it is possible to search the code and rapidly retrieve the image. Those "meaningful words" will, of course, depend on the context but the name of the author of a letter, the major subject of the letter and its date would be logical choices for correspondence documents.

An alternative method, which is especially useful for some contexts, is to assign a code symbol to each document as it is displayed. This symbol, which can be an alphanumeric string, is also easy to search, thereby locating the desired page. Such a symbol or string can be entered by keyboard at stage 84. A further alternative is to store the converted selected words with the image to be used as "passwords", allowing the words to be searched. If the image directly follows the ASCII words, location of the latter reveals the former. The image signals with ASCII code are then stored, 86.

If not all of each image is to be stored (87), portions must be selected 88 and identified for storage. The techniques for identifying the portions (90) are essentially the same as for identifying portions to be converted, although the criteria would likely be different and the command is necessarily different.

In any event, once the decision has been made, a command is given to store the chosen material and the signals representative of the image are sent 92 to one of units 22-25 of the data bank mass store for storage in image form in a predetermined storage address format.

The system also provides for the ability to retrieve and display the convertible parts of the entire document from converted code, 94, and to either designate that entire code batch for data bank storage 96 or selected portions thereof 98, along with parts 100. The retrieved and displayed code image can then be edited 102 and stored 104.

As part of the "consistent storage" concept, it is important for those portions of the image which cannot be converted (such as pictures, designs, oversize lettering and the like) to be stored in identifiable locations. This is particularly significant for retrieval of the stored documents in a form which is as close to the original form as possible, or for the reproduction of stored material which is to be published (i.e., as in so-called "desktop publishing") in the form of "clip art" along with text produced from code-converted material and then subsequently edited. When there is a mixture of recognizable (convertible) material and unconvertible (graphics) material on a single page, the storage of the two must be correlated in such a way that the image be identified as fitting into a particular blank in the text so that, after editing, the text and image can be recalled from ASCII and image storage, respectively, and correlated for printing by a laser printer, for example. They can also be stored in the mass store in a "mixed" arrangement of code and bit mapping, as previously indicated.

The selection process can be manually accomplished using the keyboard 36, a mouse 38 or voice input to microphone 40 as described in the above-mentioned U.S. Pat. Nos. 4,553,261 and 4,726,065. The selection process can also be automated in accordance with U.S. Pat. No. 4,553,261 especially for "mass type" documents, i.e., a number of documents such as forms all of which have the same layout and from which information from the same region or regions of the form will be extracted and processed each time.

On mass type documents it cannot be guaranteed that the document positioning in the scanner will always be the same because of the inconsistency of paper-handling equipment. It is, however, necessary that the selection system have a reference point from which the selected field can be located accurately. One or more symbols can therefore be preprinted at predetermined locations such as the top left or right on each form to act as locators, symbols such as a reticule or crosshair "+" being suitable for this purpose. This is particularly relevant to the processing of order forms or the like in which quantity, description and similar information must be extracted reliably each time.

It is also possible to associate a "password" with selected material to be stored. The password can be selected out of the image of the document displayed on the screen by the user. The password selected is then retrieved from the ASCII code file as explained above. Additional passwords can be added, being independent of the image.

While certain advantageous embodiments have been chosen to illustrate the invention, it will be understood by those skilled in the art that various changes and modifications can be made therein without departing from the scope of the invention as defined in the appended claims.

What is claimed is:

1. A system for facilitating and controlling the input of data from source documents into a data bank comprising
   a computer including a microprocessor, addressable memory, a monitor and a program input means;
   scanner means for viewing a sequence of documents and producing an output of electrical signals representative of light and dark patterns thereon from which an image of the patterns can be reproduced on the monitor;
   a controller module for controlling the flow of signals to and from selected portions of the system including said scanner and said computer and for controlling the sequence of operation of the system, said controller module having at least one microprocessor and addressable memory;
   connector means for connecting said controller module to said scanner means and to said computer;
   first memory means for temporarily storing said electrical signals representative of said patterns;
   character recognition software means for converting signals representative of said patterns into code recognizable by said computer;
   second memory means for temporarily storing said code;
   means for selecting and identifying portions of the temporarily stored signals representing said patterns and retrieval means, including said controller module, for delivering signals representative of the selected portions in code form;
   first mass storage means for storing recognized pattern signals and said code; and
   second mass storage means for storing signals representative of said image in a form such that said signals are directly correlated with code counterparts to said signals in the first mass storage means for storing said code.

2. A system according to claim 1 wherein said character recognition software is delivered to said program input means and stored in said computer addressable memory.

3. A system according to claim 1 wherein said character recognition software means is delivered to said controller module and stored in said module addressable memory.

4. A system according to claim 3 wherein said controller module includes means for sequentially and cyclically performing a plurality of different tasks including controlling operation of said scanner and controlling the delivery of said signals representative of portions of said image.

5. A system according to claim 1 and further comprising data compression means for receiving data signals from said controller module and compressing said data to occupy less memory in said first mass storage means than uncompressed data signals.

6. A system according to claim 5 and further comprising a digitizing camera connected to said controller for viewing documents and providing to said controller a sequence of electrical signals representative of digitized patterns of said documents.

7. A system according to claim 1 and further comprising a digitizing camera connected to said controller for viewing documents and providing to said controller a sequence of electrical signals representative of digitized patterns of said documents.

8. A system according to claim 1 wherein said program input means comprises a disk drive for receiving removable disks carrying program and data information.

9. A system according to claim 8 wherein said program input means comprises a fixed disk drive.

10. A system according to claim 1 wherein said means for selecting and identifying includes said monitor for displaying said image and a keyboard for distinctively coding the selected portions of said image.

11. A system according to claim 1 wherein said means for selecting and identifying includes said monitor for displaying said image and a mouse input means for distinctively coding the selected portions of said image.

12. A system according to claim 1 wherein said means for selecting and identifying includes said monitor for displaying said image, a mouse for identifying the selected portions and voice input means for distinctively coding the identified portions of said image.

13. A system according to claim 1 wherein said means for selecting and identifying includes said monitor for displaying said image, a keyboard for identifying the selected portions and voice input means for distinctively coding the identified portions of said image.

14. A system according to claim 1 which includes a plurality of controller modules.

15. A method for storing and selectively accessing code representative of image data comprising the steps of forming digital signals representative of an image on a document containing text recognizable and convertible into a machine-readable code, generating an image on a display from the digital signals, temporarily storing the digital signals in an arrangement in a first memory file, converting those signals representative of text into a machine-readable code, temporarily storing the code in a second memory file in an arrangement substantially identical to the arrangement in the first memory file such that each portion of the code is located in a region in the second memory file having an exact counterpart in the first memory file which contains the signals from which the portion of the code was derived, designating a portion of the displayed image for subsequent processing, locating the portion of the first memory file containing the signals from which the designated portion of the displayed image was produced, and locating in the second memory file the code representative of the designated portion on the basis of the location of the signals in the first memory file.

16. A method according to claim 15 and further including copying the code so located into a separate memory file for processing.

* * * * *